(12) United States Patent
Suenaga et al.

(10) Patent No.: US 6,667,124 B2
(45) Date of Patent: Dec. 23, 2003

(54) SEAL FOR FUEL CELL AND FORMING METHOD THEREFOR

(75) Inventors: Toshihiko Suenaga, Wako (JP); Masajirou Inoue, Wako (JP); Nobuaki Kimura, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 287 days.

(21) Appl. No.: 09/905,985

(22) Filed: Jul. 17, 2001

(65) Prior Publication Data

US 2002/0034670 A1 Mar. 21, 2002

(30) Foreign Application Priority Data

Jul. 19, 2000 (JP) .......................................... 2000-219341

(51) Int. Cl.[7] .......................... H01M 2/00; H01M 8/02; H01M 8/04; H01M 2/08
(52) U.S. Cl. .............................. 429/35; 429/36; 429/37; 277/628; 425/412
(58) Field of Search .............................. 429/34, 35, 36, 429/37; 425/412; 277/628

(56) References Cited

U.S. PATENT DOCUMENTS

| | | | |
|---|---|---|---|
| 6,231,053 B1 | * 5/2001 | Wakamatsu | 277/628 |
| 6,261,711 B1 | * 7/2001 | Matlock | 429/34 |
| 6,337,120 B1 | * 1/2002 | Susaki | 428/66.04 |
| 6,387,557 B1 | * 5/2002 | Krasij | 429/32 |
| 6,399,234 B2 | * 6/2002 | Bonk | 429/32 |
| 6,517,338 B1 | * 2/2003 | Koga | 425/412 |
| 6,531,236 B1 | * 3/2003 | Hatoh | 429/34 |

FOREIGN PATENT DOCUMENTS

JP 08-250130 9/1996

* cited by examiner

*Primary Examiner*—Mark Ruthkosky
(74) *Attorney, Agent, or Firm*—Arent Fox Kintner Plotkin & Kahn PLLC

(57) ABSTRACT

A seal in a fuel cell for sealing a membrane electrode assembly comprises a pair of catalytic electrode layers, a polymerized electrolytic membrane held between the catalytic layers, and a gas diffusion layer layered on the outer surface of the catalytic electrode layer. The seal is integrally formed with the polymerized electrolytic membrane. The height thereof is greater than that of the gas diffusion layer. The difference between the heights of the polymerized electrolytic membrane and the gas diffusion layer is constant.

8 Claims, 5 Drawing Sheets

SEAL FOR FUEL CELL AND FORMING METHOD THEREFOR

BACKGROUND OF THE INVENTION

1. Technical Field

The present invention relates to seals for gas sealing in solid polymer electrolyte fuel cells, and relates to a forming method therefor.

2. Related Art

In solid polymer electrolyte fuel cells, a separator is layered on both sides of a plate-shaped membrane electrode assembly to form a unit of the layered structure, and the plural units are layered to form a fuel cell stack. The membrane electrode assembly is a layered structure, in which a polymerized electrolytic membrane is held by a positive catalytic electrode (cathode electrode plate) and a negative catalytic electrode (anode electrode plate), and a gas diffusion layer is layered on the outer surface of each catalytic electrode. The separator is made from a material having electron transmitting characteristics, and has plural grooved gas passages in which a fuel gas such as hydrogen gas, an oxidizing gas such as oxygen or air, and a coolant flow individually. The separator is layered on the membrane electrode assembly such that linear protrusions between the gas passages are contacted with the gas diffusion layer.

According to the fuel cell, a fuel gas is provided to the gas passage of the separator at the negative electrode side, and an oxidizing gas is provided to the gas passage of the separator at the positive electrode side, whereby electricity is generated by electrochemical reaction. During the operation of the fuel cell, the gas diffusion layers transmit the electrons generated by the electrochemical reaction between the catalytic electrode layers and the separators, and diffuse the fuel gas and the oxidizing gas. The catalytic electrode layer in the negative electrode side results in a chemical reaction for the fuel gas so as to generate protons and electrons. The catalytic electrode layer in the positive electrode side generates water from oxygen, the proton, and the electron, and the polymerized electrolytic membrane facilitates ionic migration for the proton, whereby the electric power is provided via the positive and negative catalytic electrode layer.

In the above-described fuel cell, the fuel gas, the oxidizing gas, and the coolant must be flowed in the individual gas passages, so that the gas passages are separated from each other by a seal. The sealing portion varies according to the structure of the fuel cell stack. For example, a seal is provided around a communicating opening of the gas passages penetrating the fuel cell stack, around the membrane electrode assembly, around a coolant passage provided on the outer surface of the separator, and around the circumference of the outer surface of the separator.

According to conventional sealing technology, in general, an elastic material made from an organic rubber of the fluorine type, silicone type, ethylene propylene type, or the like, is formed into a shape of a sheet or an O-ring, and is mounted to a sealing portion. The sealing member seals the sealing portion by a reaction force generated by being compressed in a stacked condition. As other sealing structures, a seal in which an inorganic material formed by carbon or ceramics is compressed, a mechanical seal using caulking, adhering, and the like have been provided.

Fuel cells are often carried or installed in automobiles for use. In these cases, the cells are stringently required to be small and thin. Since separators are usually made from brittle carbon, they are readily broken during assembling of a fuel cell stack. Therefore, seals made from organic rubbers are widely used, since they are flexible and have suitable reaction force, thereby preventing breakage of the separator in the assembly a fuel cell stack.

FIG. 6A through FIG. 6E show a related method for providing a seal, which is made from an organic rubber and tightly contacts with a separator (not shown), over the circumference of the membrane electrode assembly 1. The membrane electrode assembly 1 is formed such that a polymerized electrolytic membrane 4 is held by a cathode electrode plate 2 and an anode electrode plate 3, and a gas diffusion layer 5 is layered on the outer surface of each electrode plate 2 or 3. The center electrolytic membrane 4 has a larger area than that of each electrode plate 2 or 3 and each gas diffusion layer 5, and the circumference 4a thereof projects from them. As shown in FIG. 6E, a seal 60 is integrally formed with the circumference 4a. Reference numerals 70 and 80 in FIGS. 6A through 6E are an upper die and a lower die of a forming die. In the forming die, recesses 71 and 81 into which the membrane electrode assembly 1 is fitted and grooves 72 and 82 forming a cavity 90 are formed in vertical symmetry. A gate 73 communicated to the cavity 90 from outside is formed in the upper die.

In order to provide the seal 60 to the membrane electrode assembly 1, first, as shown in FIG. 6A, the membrane electrode assembly 1 is fitted into the recess 81 of the lower die 80, and next, as shown in FIG. 6B, the upper die 70 is lowered and the membrane electrode assembly 1 is fitted into the recess 71 of the upper die 70. Then, as shown in FIG. 6C, the upper and lower dies 70 and 80 are clamped to each other, and next, as shown in FIG. 6D, a sealing material 60A is charged into the cavity 90 from the gate 73. The sealing material 60A is vulcanized when the material is a vulcanizing rubber, is heated when the material is of the heat-cure type, or is then removed from the opened upper and lower dies 70 and 80 without heating when the material is of the thermoplastic type, a membrane electrode assembly 1 as shown in FIG. 6E is then obtained. The electrolytic membrane 4 of the membrane electrode assembly 1 is integrally formed with the seal 60 which surrounds the electrode plates 2 and 3, and the gas diffusion layer 5.

The thickness of the membrane electrode assembly 1 is not strictly constant, and is sometimes thicker or thinner than the regular thickness. According to the forming method shown in FIGS. 6A through 6E, when the thickness of the membrane electrode assembly 1 is in the regular range, suitable tightening thickness of the seal, namely, a sealing pressure and a sealing height can be obtained. However, when the thickness of the membrane electrode assembly 1 exceeds the regular range, as shown in FIG. 7A, the circumferences of the upper and lower dies 70 and 80 do not contact sufficiently with each other and form a clearance S1, into which the material for sealing inserts. As a result, as shown in FIG. 7B, a burr 61 is formed at the outer circumference of the seal 60, and the thickness of the seal 60 is greater than the regular range thereof, and the burr must be removed.

In contrast, when the thickness of the seal 60 is thinner than the regular range, as shown in FIG. 8A, a clearance S2 is formed between the upper die 70 and the membrane electrode assembly 1, the seal 60 is formed without compression of the membrane electrode assembly 1. As a result, as shown in FIG. 8B, the height H2 of the seal 60 from the membrane electrode assembly 1 is greater than the regular range. Therefore, the seal 60 is excessively compressed when a fuel cell stack is assembled, so that the separator is damaged or deformed. Furthermore, the material for sealing may flow into the clearance S2 between the upper die 70 and the membrane electrode assembly 1 so as to damage the membrane electrode assembly, and the sealing material may adhere to the membrane electrode assembly 1, so that the power generation performance may be deteriorated or energizing may be impossible in some cases.

SUMMARY OF THE INVENTION

Therefore, an object of the present invention is to provide a seal for fuel cell and a forming method therefor, in which constant sealing pressure and sealing height can be obtained even if the thickness of the membrane electrode assembly varies, whereby problems such as damages to members such as separators closely contacting with the seal or leakage of the seal can be inhibited in the condition in which membrane electrode assemblies are assembled to a fuel cell stack, so that excellent sealing performance can be obtained.

The invention provides a seal in a fuel cell for sealing a membrane electrode assembly comprising: a pair of catalytic electrode layers, a polymerized electrolytic membrane held between the catalytic layers, and a gas diffusion layer layered on the outer surface of the catalytic electrode layer; wherein the seal is integrally formed with the polymerized electrolytic membrane, the height thereof is greater than that of the gas diffusion layer, and the difference between the heights of the polymerized electrolytic membrane and the gas diffusion layer is constant.

According to the seal in the invention, the height of the seal with respect to the membrane electrode assembly is constant even if the thickness of the membrane electrode assembly varies. Therefore, in assembling a fuel cell stack by stacking the membrane electrode assemblies with a predetermined assembling pressure, the sealing pressure and the sealing height is constant in accordance with the assembling pressure. As a result, problems such as damage of the separator closely contacting with the seal and gas leakage due to insufficient sealing pressure can be inhibited, whereby excellent sealing properties can be obtained. Since the seal is integrally formed with the electrolytic membrane, the number of parts can be reduced, and handling for assembling is facilitated and assembling accuracy can be improved. The seal in the invention is integrally formed with the electrolytic membrane as mentioned above. Specifically, the seal is preferably adhered to the electrolytic membrane by vulcanizing adhering or melting adhering. That is, the portion adhered by vulcanizing or melting is superior in adhesion properties, so that permeation of gas, and the like, at adhered portions can be completely prevented.

The invention provides a method for forming a seal in fuel cell for sealing a membrane electrode assembly comprising: a pair of catalytic electrode layers, a polymerized electrolytic membrane held between the catalytic layers, and a gas diffusion layer layered on the outer surface of the catalytic electrode layer; wherein the membrane electrode assembly is set in a forming die having a cavity in which the seal is integrally formed with the polymerized electrolytic membrane; the die is clamped so as to load predetermined pressure on the membrane electrode assembly; and a material for the seal is charged into the cavity.

According to the forming method of the invention, since predetermined pressure is loaded on the membrane electrode assembly in clamping the dies, the membrane electrode assembly is usually compressed by the dies, so that the height of the cavity of the seal, namely, the difference between the height of the seal after forming and the gas diffusion layer of the membrane electrode assembly is usually constant independently of the thickness of the membrane electrode assembly. Therefore, the sealing pressure and the sealing height are constant in assembling the fuel cell stack even if the thickness of the membrane electrode assembly varies. As a result, problems such as damage of members closely contacting with the seal and leakage due to insufficient sealing pressure can be inhibited, whereby excellent sealing properties can be obtained.

It should be noted that the predetermined pressure is preferably approximately the same as an assembling pressure in assembling a fuel cell stack by stacking plural membrane electrode assemblies. In this feature, the membrane electrode assembly is pre-compressed with the assembling pressure in forming the seal before assembling the fuel cell stack, so that variation of the thickness thereof can be reduced, and the variation of the compressing thickness can be reduced. Therefore, the clamping thickness of the seal need not be excessive, and the size of the seal can be set in a suitable range.

As materials for the seal in the invention, an elastic material made from an organic rubber of the fluorine type, silicone type, ethylene propylene type, or the like, may preferably be used. The seal can be adhered to the electrolytic membrane simultaneously forming the seal without adhering treatment such as primer treatment by selecting the same type material for the seat as the electrolytic membrane according to the kind of the material for the electrolytic membrane. When rigid adherence is required, adhering components can be added to the seal. For example, fluorine rubbers and elastomers of the fluorine type can be used for sealing materials when the electrolytic membrane is of the fluorine type.

DETAILED DESCRIPTION OF THE INVENTION

An embodiment of the invention will be explained hereinafter with reference to the figures.

Figure 1A:
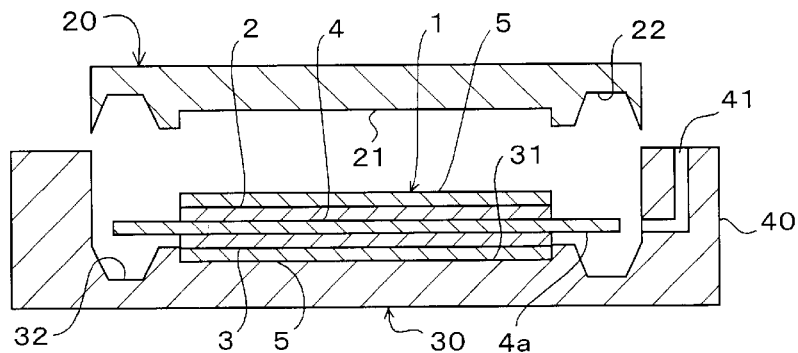
FIGS. 1A to 1E are vertical cross sections showing steps of a forming method for a seal, in order, according to an embodiment of the invention.
Figure 1B:
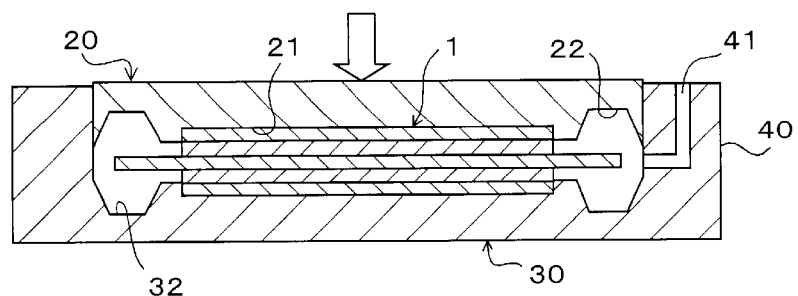
Figure 1C:
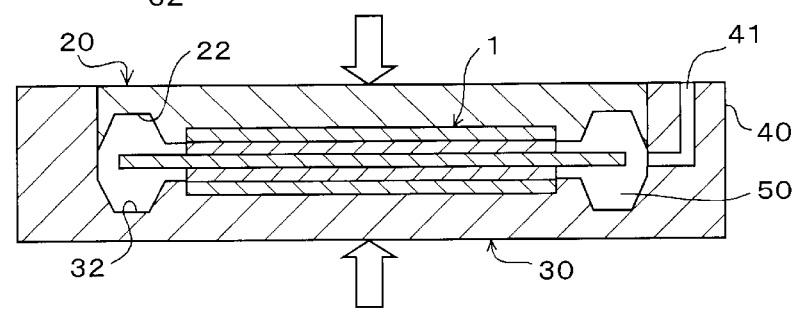
Figure 1D:
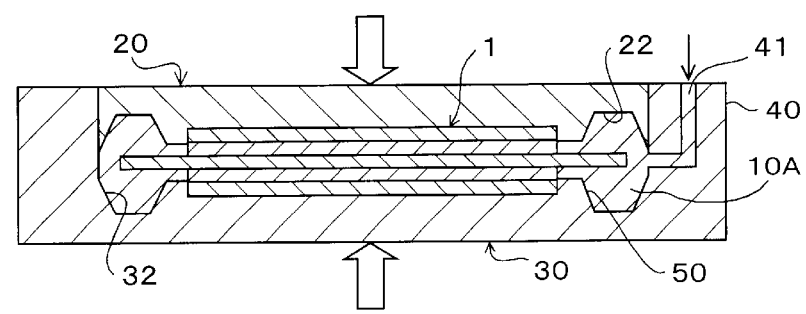
Figure 1E:
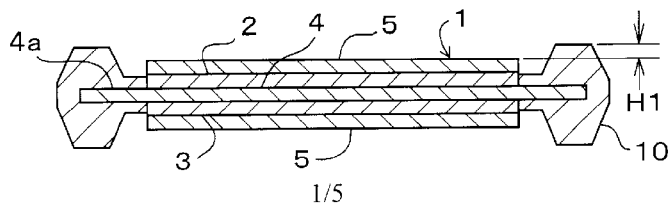
Figure 2:
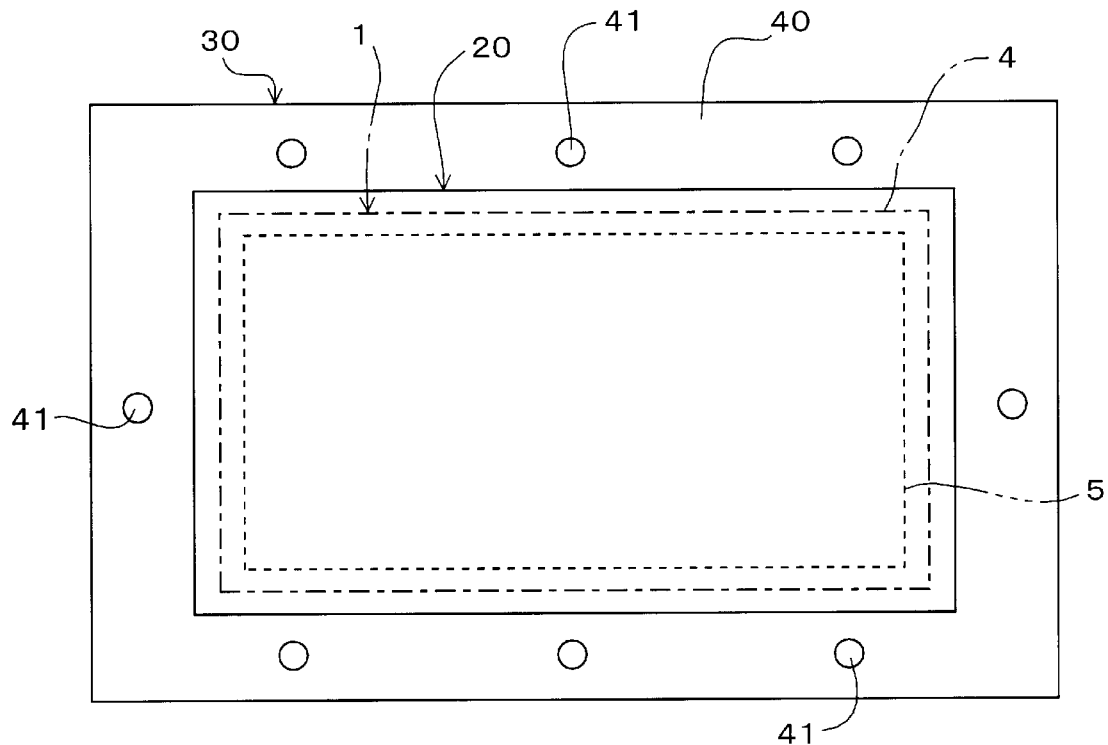
FIG. 2 is a plane view of a die for forming a seal according to the embodiment of the invention.

FIGS. 1A through 1E are vertical cross sections showing a method for integrally forming a seal 10 made from an organic rubber with a membrane electrode assembly 1, in the order of the steps, and FIG. 2 is a plane view of a die for forming the seal 10. As shown in FIG. 2, the membrane electrode assembly 1 is a rectangle. As shown in FIG. 1E, a polymerized electrolytic membrane 4 is held between a cathode electrode plate 2 and an anode electrode plate 3. A gas diffusion layer 5 is layered on the outer surface of each electrode plate 2 and 3. The center electrolytic membrane 4 has a larger area than that of each electrode plate 2 or 3 and each gas diffusion layer 5, and the circumference 4a thereof projects from them. A seal 10 is integrally formed with the circumference 4a. The membrane electrode assembly 1 is layered with a separator on both surfaces thereof to form a unit, and plural units are layered with predetermined assembling pressure to form a fuel cell stack.

Reference numerals 20 and 30 in FIGS. 1A and 1B are an upper die and a lower die of a forming die. A recess 31 into which the membrane electrode assembly 1 is fitted is formed at the bottom of the lower die 30, and a groove 32 having a trapezoidal cross section for forming a part of a cavity 50 is formed at the circumference of the recess 31. The cross section of the groove 32 is not limited to a trapezoid, but several shapes such as a circle, ellipse, triangle, and the like, can be applied according to the compressing thickness and stress on a seal. A frame-shaped outer die 40 projecting upward is integrally formed with the lower die 30 around the groove 32. In contrast, the upper die 20 can be fitted into the outer die 40 of the lower die 30, and has a recess 21 and a groove 22 similar to that of the lower die 30. Plural gates 41 are formed in the outer die 40, are communicated to the cavity 50 from outside, and have a circular cross section. The gate 41 extends in an L-shape so as to be opened to the upper surface and the inner side surface of the outer die 40. The opening of the gate 41 in the inner side surface is formed at the position where it faces the electrolytic membrane 4 of the membrane electrode assembly 1 which is set in the recess 31.

The number of the gate 41 and the position thereof are suitably chosen in accordance with the size (cross section) of the gate 41, the temperature of the material for the seal in charging, the charging pressure, amount of charging, flowability of the material, and the forming cycle. The gate 41 can be formed in either the upper die 20 or the lower die 30, and is positioned in accordance with the shape of the seal 10. It should be noted that the opening of the gate 41 is preferably positioned apart from the sealing surface (upper and lower surface) of the electrolytic membrane 4 as in the embodiment, whereby the sealing properties can be improved. Since the sealing material left in the gate 41 is finally cut from the seal 10, a slender portion for facilitating the cutting may be formed in the gate 41.

Next, the method for forming the seal 10 to the membrane electrode assembly 1 will be explained hereinafter. First, as shown in FIG. 1A, the membrane electrode assembly 1 is fitted into the recess 31 of the lower die 30, as shown in FIG. 1B, the upper die 20 is then lowered to fit the recess 21 to the membrane electrode assembly 1. As shown in FIG. 1C, the upper and lower dies 20 and 30 are clamped. In clamping the dies 20 and 30, the clamping pressure is directly loaded on the membrane electrode assembly 1. The clamping pressure is set at a value approximately the same as the assembling pressure when the plural membrane electrode assemblies 1 are stacked with each other and are assembled into a fuel cell stack. That is, approximately the same pressure as the assembling pressure for the fuel cell stack is loaded on the membrane electrode assembly 1. In clamping the dies 20 and 30, the cavity 50 is formed mainly by the grooves 22 and 32 of the upper and lower dies 20 and 30.

Next, maintaining the clamping condition, sealing material 10A is charged from the gate 41 into the cavity 50 and is filled therein. The sealing material may not be charged from all the gates 41, but some of them may be allowed to remain as air venting holes. When the injection molding machine can maintain the forming die in a vacuum, an air venting hole is not needed. The sealing material 10A is vulcanized when the material is a vulcanizing rubber, is heated when the material is of the heat-cure type, or is then removed from the opened upper and lower dies 20 and 30 without heating when the material is of the thermoplastic type, a membrane electrode assembly 1 as shown in FIG. 1E is then obtained. The entire surface of the circumference 4a of the electrolytic membrane 4 is integrally formed with the seal 10 which surrounds the electrode plates 2 and 3, and the gas diffusion layer 5.

According to the above-described forming method, approximately the same pressure as the assembling pressure in assembling the fuel cell stack is loaded on the membrane electrode assembly 1 in clamping the dies 20 and 30, so that the height of the cavity 50 of the seal 10, namely, the difference H1 between the height of the seal 10 after forming and the gas diffusion layer 5 of the membrane electrode assembly 1, is usually constant independently of the thickness of the membrane electrode assembly 1. Therefore, the sealing pressure and the sealing height are constant in assembling the fuel cell stack even if the thickness of the membrane electrode assembly 1 varies. As a result, problems such as damage of the separator closely contacting with the seal 10 and gas leakage due to insufficient sealing pressure can be inhibited, whereby excellent sealing properties can be obtained.

Since the seal 10 is integrally formed with the electrolytic membrane 4, the number of parts can be reduced, and handling for assembling is facilitated and assembling accuracy can be improved. Specifically, when the seal 10 is adhered to the electrolytic membrane 4 by vulcanizing or melting, the adhesion properties can be improved, so that permeation of gas, and the like, at the adhering portion between the electrolytic membrane 4 and the seal 1 can completely be prevented.

Furthermore, the entire surface of the circumference 4a projecting from the electrode plates 2 and 3 and the gas diffusion layer 5 is covered by the seal 10, so that seal malfunction due to wrinkles formed in the electrolytic membrane 4 does not occur. The electrolytic membrane 4 easily absorbs moisture, and easily wrinkles with moisture absorption. Therefore, the working environment has been maintained at low humidity, and it has been required that assembly be performed under strict humidity control. In contrast, in the embodiment, the circumference 4a of the electrolytic membrane 4, which easily wrinkles, is covered by the seal 10, so that the humidity control for preventing wrinkle can be easy, and problems in assembly due to unsuitable humidity control can be inhibited.

Figure 3:
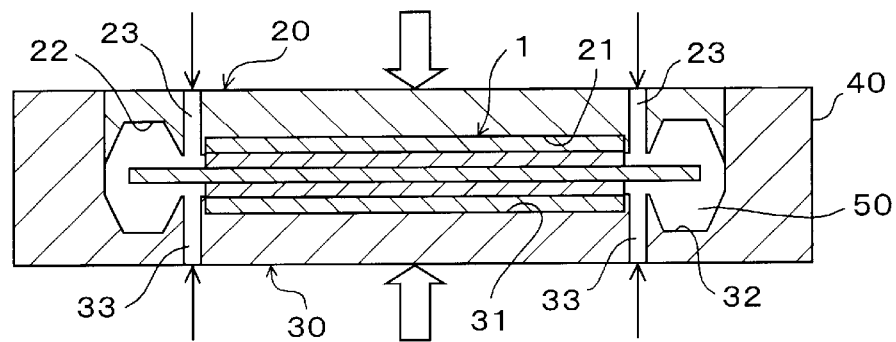
FIG. 3 is a vertical cross section of an arrangement of the die in the embodiment of the invention.

FIG. 3 shows an arrangement of the forming die. In the arrangement, gates 23 and 33 are formed in the upper die 20 and the lower die 30 respectively. The gates 23 and 33 are positioned between the recess 21 (31) and the groove 22 (32) and are opposing each other. According to the arrangement of the gates 23 and 33, the sealing material is simultaneously flowed into the cavity 50 from above and below the electrolytic membrane 4, whereby the electrolytic membrane 4 is not easily broken or bent.

Figure 4:
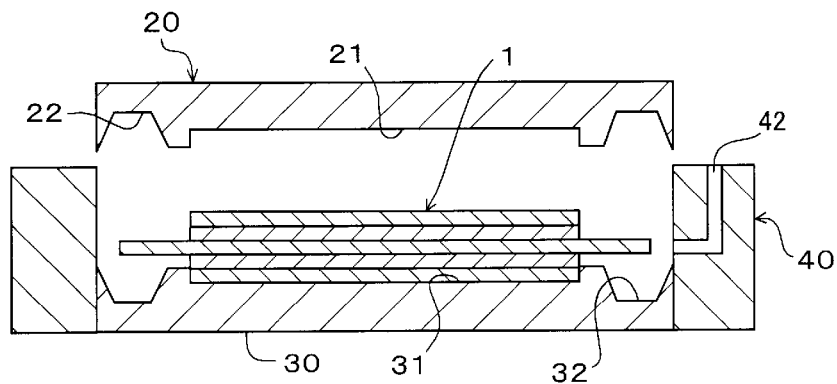
FIG. 4 is a vertical cross section of another arrangement of the die in the embodiment of the invention.
Figure 5:
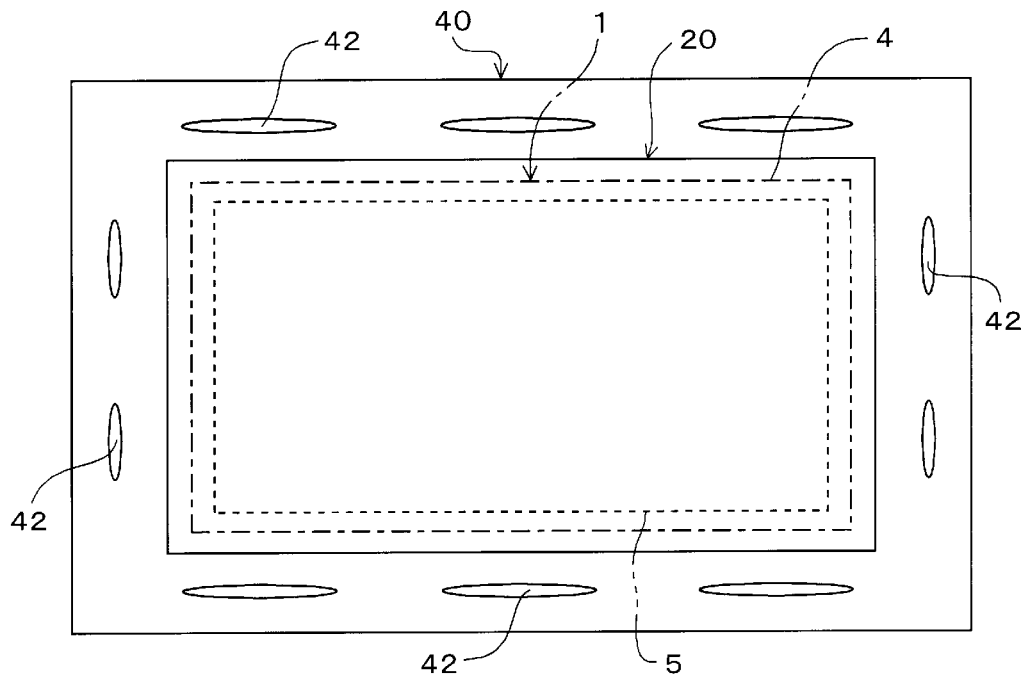
FIG. 5 is a plane view of the die in FIG. 4.
Figure 6A:
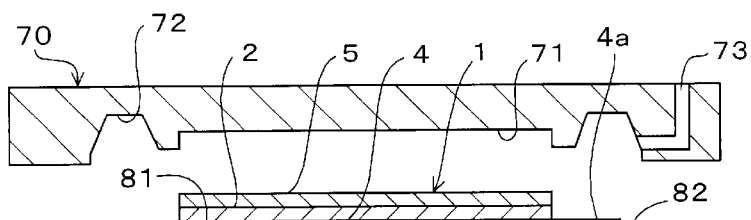
FIGS. 6A to 6E are vertical cross sections showing related steps of a forming method for a seal, in order, according to a forming method for the seal.
Figure 6B:
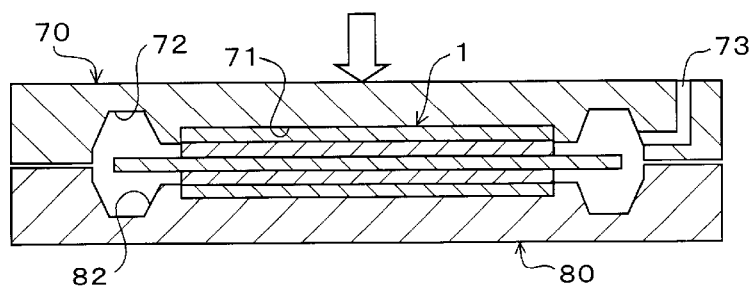
Figure 6C:
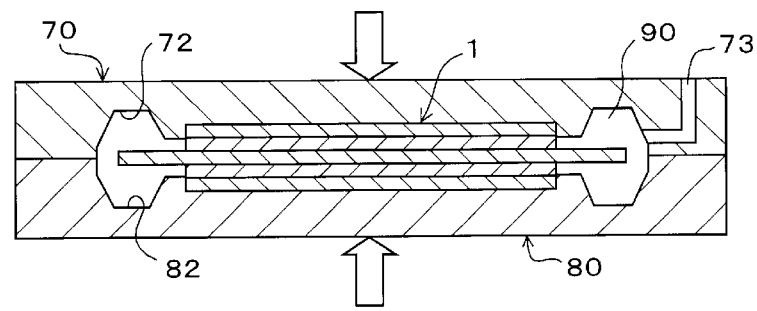
Figure 6D:
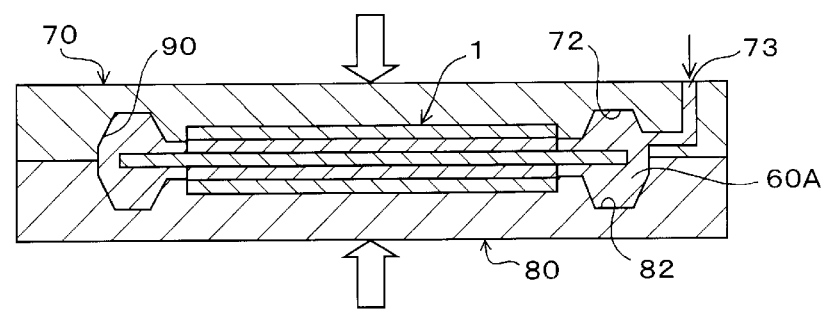
Figure 6E:
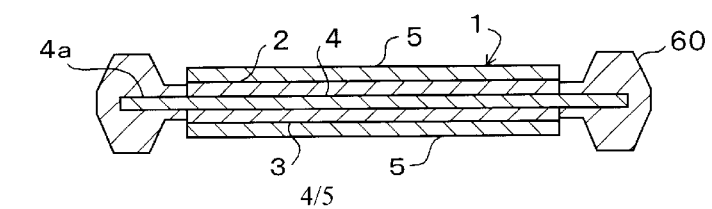
Figure 7A:
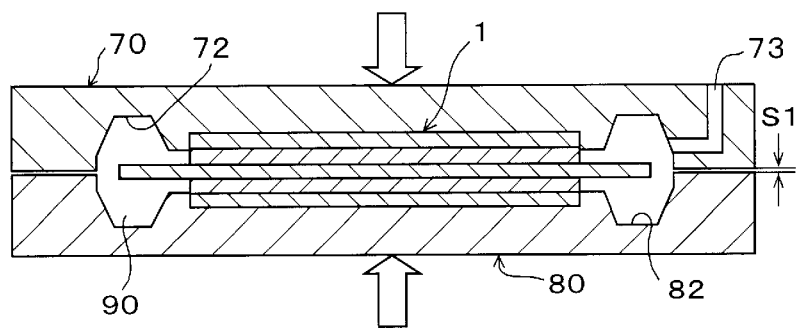
FIG. 7A is a vertical cross section of a closed condition of a forming die according to a related forming method for a seal when the thickness of the membrane electrode assembly is greater than the regular range.
Figure 7B:
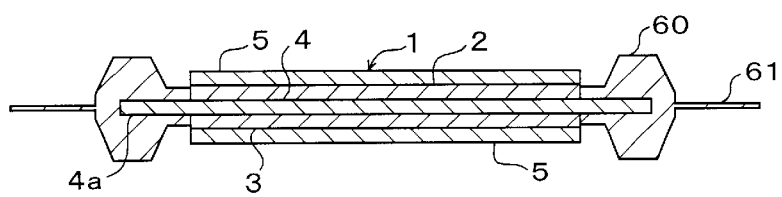
FIG. 7B is a vertical cross section of the membrane electrode assembly formed thereby.
Figure 8A:
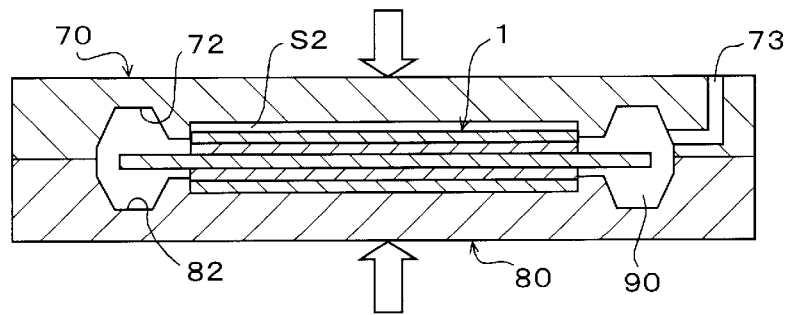
FIG. 8A is a vertical cross section of a closed condition of a forming die according to a related forming method for a seal when the thickness of the membrane electrode assembly is thinner than the regular range.
Figure 8B:
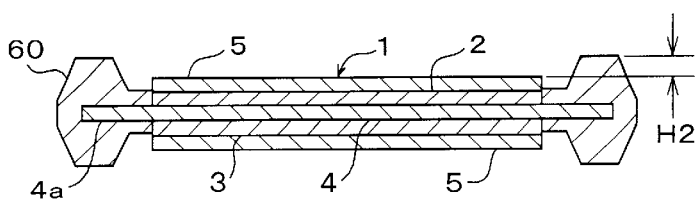
FIG. 8B is a vertical cross section of the membrane electrode assembly formed thereby.

It should be noted that the forming die is divided into two-pieces, i.e., the upper and lower dies, but three-pieces dies shown in FIG. 4 can also be applied to the invention. In the forming die, the upper and lower dies are formed in vertical symmetry, and the outer die 40 is individually formed. FIG. 5 is a plane view of the forming die, and the gate 42 formed in the outer die 40 is elliptical. The shape of the cross section of the gate 42 is not limited to an ellipse or circle in the above gate 41, and it may be a rectangle, or the like.

The opening communicating the gate 42 to the cavity 50 is preferably elongated along the direction in which the seal 10 extends, so that the sealing material can be filled smoothly and reliably in the cavity 50. The cross section of the opening is preferably as thin as possible with respect to the height of the seal 10 in order to facilitate removal of the seal 10 from the seal material in the gate.

What is claimed is:

1. A seal in a fuel cell for sealing a membrane electrode assembly comprising:

a pair of catalytic electrode layers, a polymerized electrolytic membrane held between the catalytic layers, and a gas diffusion layer layered on the outer surface of the catalytic electrode layer;

wherein the seal is integrally formed with the polymerized electrolytic membrane, the height thereof is greater than that of the gas diffusion layer, and the difference between the heights of the polymerized electrolytic membrane and the gas diffusion layer is constant.

2. A seal in a fuel cell according to claim 1, wherein the seal is adhered to the polymerized electrolytic membrane by vulcanizing or melting.

3. A method for forming a seal in a fuel cell for sealing a membrane electrode assembly comprising:

a pair of catalytic electrode layers, a polymerized electrolytic membrane held between the catalytic layers, and a gas diffusion layer layered on the outer surface of the catalytic electrode layer;

wherein the membrane electrode assembly is set in a forming die having a cavity in which the seal is integrally formed with the polymerized electrolytic membrane;

the die is clamped so as to load predetermined pressure on the membrane electrode assembly; and a material for the seal is charged into the cavity.

4. A method for forming a seal in a fuel cell according to claim 3, wherein the predetermined pressure is approximately the same as an assembling pressure in assembling a fuel cell stack by stacking plural membrane electrode assemblies.

5. A method for forming a seal in a fuel cell according to claim 3, wherein the forming die comprises:

a first die and a second die which are movable toward and away from each other;

an outer die disposed around the first die and the second die;

the first and second dies comprise a recess into which the membrane electrode assembly is fitted, and a groove disposed around the recess so as to form the cavity of the seal co-operating with the outer die;

the distance between the first and second dies varies the thickness of the membrane electrode assembly in clamping the dies.

6. A method for forming a seal in a fuel cell according to claim 5, wherein the outer die comprises a gate having an opening communicated with the cavity, the opening faces an edge of the polymerized electrolytic membrane.

7. A method for forming a seal in a fuel cell according to claim 6, wherein the opening is laterally elongated along the edge of the polymerized electrolytic membrane.

8. A method for forming a seal in a fuel cell according to claim 5, wherein the first and second dies comprise a gate having an opening communicated with the cavity, the openings in the first and second dies face each other at a front side and a reverse side of the polymerized electrolytic membrane.

* * * * *